(12) United States Patent
Van De Koot et al.

(10) Patent No.: US 9,796,496 B2
(45) Date of Patent: Oct. 24, 2017

(54) APPARATUS FOR PACKAGING DOSED QUANTITIES OF SOLID DRUG PORTIONS COMPRISING MOVING COLLECTING CONTAINERS AND AN ANCILLARY DOSING STATION

(71) Applicant: BD Switzerland Sàrl, Eysins (CH)

(72) Inventors: John Van De Koot, Doornspijk (NL); Eddy R. Lokkers, Espeet (NL)

(73) Assignee: BD Switzerland Sàrl, Eysins (CH)

( * ) Notice: Subject to any disclaimer, the term of this patent is extended or adjusted under 35 U.S.C. 154(b) by 160 days.

(21) Appl. No.: 14/423,349

(22) PCT Filed: Aug. 16, 2013

(86) PCT No.: PCT/EP2013/067146
§ 371 (c)(1),
(2) Date: Feb. 23, 2015

(87) PCT Pub. No.: WO2014/032993
PCT Pub. Date: Mar. 6, 2014

(65) Prior Publication Data
US 2015/0298839 A1  Oct. 22, 2015

(30) Foreign Application Priority Data
Aug. 31, 2012 (EP) .................................... 12182636

(51) Int. Cl.
*B65B 5/10* (2006.01)
*B65B 57/14* (2006.01)
(Continued)

(52) U.S. Cl.
CPC ............ *B65B 35/44* (2013.01); *A61J 7/0084* (2013.01); *B65B 5/103* (2013.01); *B65B 35/32* (2013.01); *B65G 37/00* (2013.01)

(58) Field of Classification Search
None
See application file for complete search history.

(56) References Cited

U.S. PATENT DOCUMENTS 5,555,504 A * 9/1996 Lepper ............... G05B 19/4183
700/115
5,709,063 A 1/1998 Yuyama et al.
(Continued)

FOREIGN PATENT DOCUMENTS

CN 1429166 A 7/2003
CN 1953915 A 4/2007
(Continued)

OTHER PUBLICATIONS

Office Action issued Jan. 4, 2016 in Chinese Appln. No. 201380045456.3 (12 pages).
(Continued)

*Primary Examiner* — Kavel Singh
(74) *Attorney, Agent, or Firm* — McDermott Will & Emery LLP

(57) ABSTRACT

An apparatus for packaging dosed quantities of solid drug portions includes multiple storage containers and dosing elements for storing and dispensing first dosed quantities of drug portions, multiple moving collecting containers for collecting and outputting drug portions to a packaging station, and fall tubes for guiding the drug portions dispensed by the dosing elements to the collecting containers. An ancillary dosing station has multiple buffer receptacles for storing and delivering second dosed quantities of drug portions to the collecting containers. A conveyor moves the collecting containers between multiple locations along a predetermined path. A controller controls closure members of the buffer receptacles depending on the positions of the moving collecting containers so that drug portions temporarily held in the buffer receptacles are output to selected collecting containers.

20 Claims, 11 Drawing Sheets

(51) Int. Cl.
*B65G 1/02* (2006.01)
*B65G 37/00* (2006.01)
*B65B 35/44* (2006.01)
*A61J 7/00* (2006.01)
*B65B 35/32* (2006.01)

(56) References Cited

U.S. PATENT DOCUMENTS

| | | | |
|---|---|---|---|
| 5,844,802 A * | 12/1998 | Lepper | G05B 19/4183 |
| | | | 700/115 |
| 7,848,846 B2 | 12/2010 | Uema et al. | |
| 2007/0022713 A1 | 2/2007 | Yuyama et al. | |
| 2010/0077708 A1 | 4/2010 | Kobayashi et al. | |

FOREIGN PATENT DOCUMENTS

| | | |
|---|---|---|
| CN | 101815649 A | 8/2010 |
| DE | 9001113 U1 | 4/1990 |
| EP | 1 433 457 A1 | 6/2004 |
| EP | 2062822 A1 | 5/2009 |

OTHER PUBLICATIONS

International Search Report dated Oct. 25, 2013 for International Application No. PCT/EP2013/067146.
Written Opinion of the International Searching Authority dated Oct. 25, 2013 for International Application No. PCT/EP2013/067146.

* cited by examiner

APPARATUS FOR PACKAGING DOSED QUANTITIES OF SOLID DRUG PORTIONS COMPRISING MOVING COLLECTING CONTAINERS AND AN ANCILLARY DOSING STATION

CROSS-REFERENCE TO RELATED APPLICATION

This application is the U.S. National Phase under 35 U.S.C. §371 of International Application No. PCT/EP2013/067146, filed on Aug. 16, 2013, which claims the benefit of EP12182636.6, filed on Aug. 31, 2012. The entire contents of these applications are incorporated by reference herein.

BACKGROUND OF THE INVENTION

The present invention relates to an apparatus for packaging dosed quantities of solid drug portions, the apparatus comprising a plurality of storage containers each storing a plurality of solid drug portions and having a dosing means for dispensing first dosed quantities of solid drug portions, a plurality of collecting containers for collecting solid drug portions and for outputting the collected drug portions to a packaging station, guiding means for guiding the solid drug portions dispensed by the dosing means to one of the collecting containers, and an ancillary dosing station for delivering second dosed quantities of solid drug portions to the collecting containers, the ancillary dosing station comprising a plurality of buffer receptacles each temporarily holding one or a few solid drug portions and having a delivery means for outputting the held solid drug portion(s).

Such an apparatus is known from EP 1 433 457 A1. The document describes a medicine supply apparatus comprising a plurality of storage containers (tablet cases comprising a drive base and a container) each storing a plurality of solid drug portions and having a dosing means (in the drive base) for dispensing dosed quantities of solid drug portions. Two collecting containers are formed by two shutters. Each shutter receives the solid drug portions from one half of the storage containers and outputs the drug portions to a hopper which passes the drug portions to a packing station. The guiding means for guiding the solid drug portions dispensed by the dosing means to one of the two collecting containers are formed by vertical chutes formed by gaps between two shelves of storage containers. An ancillary dosing station for delivering second dosed quantities of solid drug portions is provided. The ancillary dosing station (called the medicine feeder) comprises a plurality of buffer receptacles (called reception compartments) each temporarily holding one solid drug portion or a few solid drug portions and having a delivery means for discharging the held solid drug portion(s) directly to the hopper.

It is usually advantageous to package dosed quantities of solid drug portions, such as tablets, capsules, caplets and pills, in bags, pouches or other types of packaging, wherein the drug portions in each bag are packed separately per ingestion, wherein the bag is provided with user information, such as the day and time of day the drug portions have to be taken. The bags for a user are typically attached to each other and supplied rolled up in a dispenser box.

The filling of individual packages with dosed quantities of solid drug portions (batches) is increasingly being automated. A known system for dosing solid medicines for final packaging in individual packages (such as the system known from EP 1 433 457 A1) comprises a plurality of supply containers (storage containers) each filled with a different type of drugs. After reading or entering a medicine prescription, the supply containers relevant to the prescription are opened in order to allow a dosed quantity of solid drug portions (e.g. one tablet or capsule or a small number of tablets or capsules) to drop into a central fall duct positioned under the outlets of the supply containers. At the bottom of the fall duct the selectively released drug portions are collected and forwarded to and filled in a package, such as a bag or pouch, after which the package is closed. Providing the package with user information can be realized here prior to or following filling of the packaging.

The known system does however have several drawbacks. A significant drawback of the known system is that the filling frequency or rate of the system depends to a considerable extent on, and is limited by, the (longest) drop time of a drug portion in the fall duct, whereby the filling frequency of the known system is limited and cannot be increased. That means that a filling cycle for a next bag may only start after the filling cycle for the present bag can be expected to complete, i.e. after expiry of the maximum time expected for a drug portion to fall from the most distant (highest) supply container along the fall duct down to the bottom and the packaging. However, owing to the permanently increasing demand for medicines, there is a need in practice to provide more packages of dosed quantities of drug portions per unit time.

Dutch application NL2007384 (not yet published) proposes an improved system for packaging dosed quantities of solid drug portions, comprising a plurality of dosing stations for dispensing dosed quantities of solid drug portions, a first endless conveyor belt for moving a plurality of parallel fall tubes (or fall ducts) coupled to the first conveyor belt along the dosing stations, wherein each fall tube is adapted to guide a dosed quantity of drug portions delivered by at least one supply container, a second endless conveyor belt for moving a plurality of collecting containers coupled to the second conveyor belt, wherein each collecting container is adapted to receive drug portions guided through one of the fall tubes, at least one dispensing and packaging station for transferring drug portions collected by each collecting container to a package and for closing the packaging. During the time the drug portions are guided by the fall tubes and fall down to the collecting containers, the fall-tubes and the collecting containers are moved in unison. Applying mobile fall tubes and collecting containers, which in fact function as temporary storage buffers, enables multiple medicine prescriptions to be collected in parallel (simultaneously) or overlapping instead of serially (successively), whereby the frequency for filling packages can be increased substantially. While the dosed quantity of drug portions drops through a fall tube, the fall tube and an underlying collecting container can be moved in continuous manner, generally in the direction of one or more following dosing stations which—depending on the prescription to be followed—can optionally be activated for the purpose of dispensing further dosed quantities of drug portions. Each collecting container can collect one prescription generally associated with one user and/or a given date and time.

The collecting container and a fall tube located above are not physically connected to each other, since uncoupling of the two components enhances the flexibility of the system. Physically separating the collecting containers from the fall tubes makes it possible to guide the collecting containers away from the fall tubes. In this context the physical length of the second conveyor belt is greater than the length of the first conveyor belt. This makes it possible to guide the collecting containers along one or more other types of (special) dosing stations (called ancillary dosing station here) for direct dispensing of drug portions to the collecting containers, i.e. not via fall tubes. These special dosing stations can advantageously be used for instance when special drug portions, being drug portions which are dosed less frequently, are applied. The Dutch application proposes an advantageous embodiment wherein each special dosing station is formed by a supply drawer coupled to a carrier frame in such a way that the supply drawer can be displaced. The use two such drawers is intended, with one supply drawer positioned above the collecting containers for the purpose of dispensing drug portions, while the other supply drawer is positioned a greater distance from the collecting containers to enable refilling thereof. It is advantageous for the purpose of filling that each supply drawer is coupled detachably to the (same) carrier frame.

It is an object of the invention to provide an apparatus for packaging dosed quantities of solid drug portions, whereby said apparatus has an increased filling rate and can dispense additional solid drug portions of an ancillary dosing station (comprising a plurality of buffer receptacles each temporarily holding one solid drug portion or a few number thereof) in a flexible manner.

According to the invention the apparatus for packaging dosed quantities of solid drug portions comprises a plurality of storage containers each storing a plurality of solid drug portions and having a dosing means for dispensing first dosed quantities of solid drug portions, a plurality of moving collecting containers for collecting solid drug portions and for outputting the collected drug portions to a packaging station, guiding means for guiding the solid drug portions dispensed by the dosing means to one of the plurality of collecting containers, an ancillary dosing station for delivering second dosed quantities of solid drug portions to the collecting containers, transport means for moving the collecting containers between at least one first location at which the collecting containers receive the solid drug portions from the guiding means, at least one second location at which the collecting containers receive the solid drug portions from the ancillary dosing station and at least one third location at which the collecting containers output the collected solid drug portions to the packaging station, the collecting containers being moved along a predetermined path, the ancillary dosing station comprising a plurality of buffer receptacles, each temporarily holding one or a few solid drug portions and having a delivering means for outputting the hold solid drug portion(s) to one of the collecting containers at the at least one second location during their movement along the predetermined path, and control means coupled to the transport means and the delivering means of the buffer receptacles for selectively controlling the delivering means depending on the positions of the moving collecting containers so that the solid drug portions temporarily held in the buffer receptacles are output to selected collecting containers.

The provision of delivering means of the buffer receptacles that can be selectively controlled by the control means depending on the positions of the moving collecting containers makes it possible to discharge a buffer receptacle into an arbitrarily selected collecting container of a plurality of moving collecting containers so that the special drug portions can be put alone into a selected collecting container or can be added to drug portions discharged from the storage containers. Moreover, multiple drug portions of multiple buffer receptacles can be discharged simultaneously into different collecting containers.

In one embodiment, the apparatus for packaging dosed quantities of solid drug portions is characterized in that the buffer receptacles of the ancillary dosing station are stationary and arranged so that each delivering means can output the solid drug portions at a specific position above the predetermined path the collecting containers are moving along, the control means being configured to trigger a particular delivering means of the stationary buffer receptacles, if a particular collecting container into which the solid drug portions is to be delivered is moved below the specific position of the particular delivering means. Preferably, each delivering means comprises a closure member at the bottom of the corresponding stationary buffer receptacle. In a preferred embodiment, the dosing station comprises at least one set of movable transport buffer receptacles, wherein the moveable transport buffer receptacles of the set can be moved together between at least one first position at which the moveable transport buffer receptacles can be filled and at least one second position at which at least a portion of the moveable transport buffer receptacles can be unloaded into the stationary buffer receptacles. In one embodiment the movable transport buffer receptacles can be moved horizontally between the at least one first position and the at least one second position. Another preferred development of this embodiment is characterized in that the predetermined path is a horizontal linear path, so that the stationary buffer receptacles are arranged in a linear row above the linear path. This simplifies the design and allows for the guiding of the moving collecting buffers by a linear rail. Preferably, the movable transport buffer receptacles of one set are arranged in a matrix of columns and rows in a horizontal plane, wherein a row of the moveable transport buffer receptacles is positioned above the row of the stationary buffer and can be unloaded, if the set of moveable transport buffer receptacles is moved into one of a number of second positions, the number of second positions corresponding to the number of receptacles in a column. The arrangement of the receptacles in rows and columns facilitates the handling when the receptacles are re-filled.

In one embodiment, the dosing station comprises two sets of movable transport buffer receptacles, wherein on set can be filled in its first position while the other set can be unloaded in one of its at least one second positions. This leads to an increased filling rate, because it avoids waiting for the re-filling of the transport buffer receptacles after the last transport buffer receptacle has been discharged into the stationary buffer receptacle.

In another preferred embodiment the dosing station comprises at least one removable transport tray having a plurality of compartments, each compartment for receiving one solid drug portion or a small number thereof to be filled into one of the set of moveable transport buffer receptacles, wherein the arrangement of the compartments of the transport tray corresponds to the arrangement of the receptacles of the set of moveable transport buffer receptacles, whereby the transport tray can be positioned above the set of moveable transport buffer receptacles positioned at the first position so that each compartment is positioned above a corresponding receptacle, the bottom of each compartment comprising a closure member which can be opened if the tray is positioned above the set of moveable transport buffer receptacles so that the transport buffer receptacles can be filled. Preferably, a fill docking station is provided to which the removable transport tray can be coupled, the fill docking station comprising means for assisting manual filling of the compartments with the solid drug portions.

In preferred embodiments, the guiding means for guiding the solid drug portions dispensed by the dosing means to one of the plurality of moving collecting containers comprise a plurality of moving fall tubes (or drop tubes), each fall tube being at least temporarily associated with a collecting container and being arranged vertically above the associated collecting container during its movement along the predetermined path at the at least one first location. Preferably, the plurality of storage containers with their dosing means are arranged in at least one matrix of rows of vertical columns, each column comprising a plurality of vertically stacked storage containers, wherein output openings of their dosing means are arranged adjacent to corresponding input openings in a sidewall of an fall tube when the moving fall tube is positioned adjacent to the column.

BRIEF DESCRIPTION OF THE DRAWINGS

The invention is described hereafter on the basis of preferred embodiments shown in the figures, wherein.

DETAILED DESCRIPTION

Figure 1:
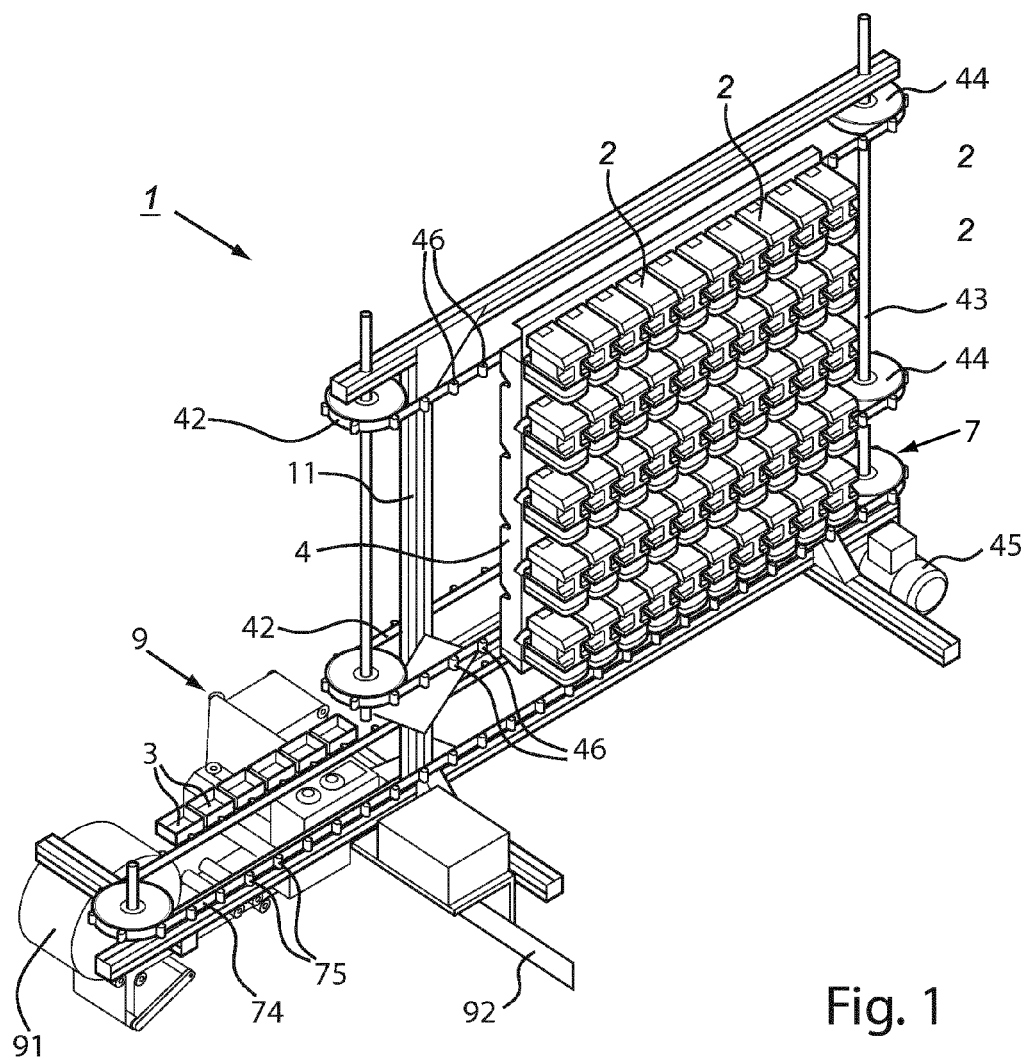
FIG. 1 is a schematic perspective view of a preferred embodiment of the present invention.
Figure 2:
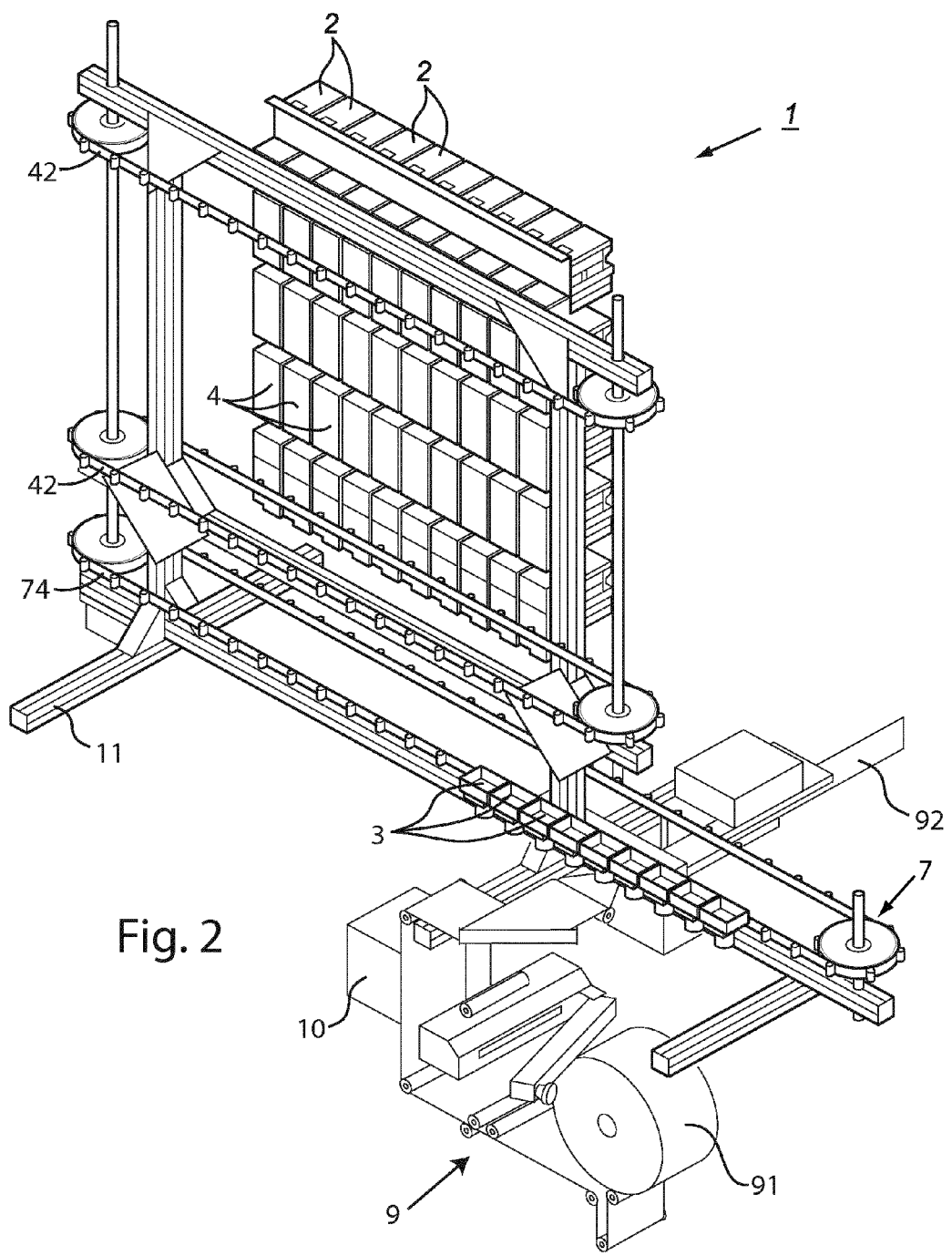
FIG. 2 is a another schematic perspective view of the embodiment shown in FIG. 1.
Figure 3:
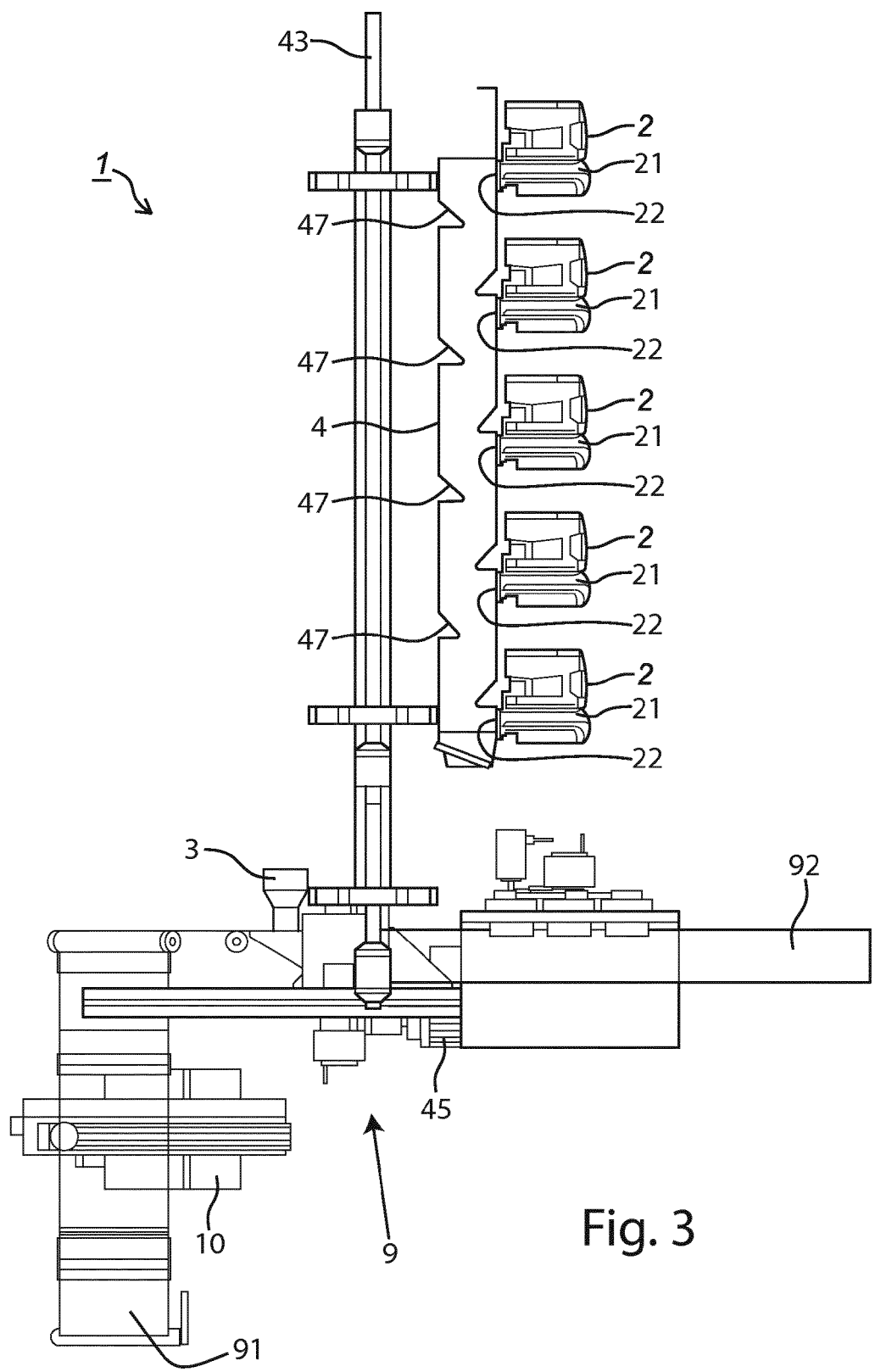
FIG. 3 is a schematic side view of the embodiment shown in FIGS. 1 and 2.

FIG. 1 shows a schematic perspective front view of a preferred embodiment of the apparatus 1 for packaging dosed quantities of solid drug portions (e.g. tablets, capsules, caplets and other types of pills) dispensed from dispensing means of a plurality of storage containers 2 and transported to a packaging station 9 according to the present invention. FIG. 2 is a corresponding perspective rear view of the embodiment of FIG. 1. FIG. 3 shows a side view of this embodiment.

Apparatus 1 comprises for this purpose a support structure 11 (frame) to which a plurality of storage containers 2 (also called canisters) are connected in stationary, detachable manner. Each storage container 2 is adapted here to hold a supply of a type of drug (pharmaceutical). Different storage containers 2 will generally hold a supply of a different type of drugs, although it is also possible to envisage frequently-dosed drugs being held by a plurality of storage containers 2.

The storage containers 2 comprise a detachable part containing the supply of solid drug portions, and a stationary part mounted to a frame of the support structure 11. The releasable part of the storage container 2 comprises a housing and a cover closing the housing. The housing is preferably manufactured at least partially from a transparent material so that the degree of filling can be determined without opening the storage container 2. An outer side of the housing is provided with a receiving space for a tablet or capsule (drug portion) corresponding to tablets or capsules held in the housing. Receiving space is covered by means of a transparent cover element. A person can hereby see immediately with which tablets or capsules the storage container 2 has to be filled. Accommodated in housing is an axially rotatable individualizing wheel which is detachably connected to the housing and which is adapted during axial rotation to separate a single tablet or single capsule which can subsequently be removed from housing via an inclined fall guide arranged in the housing and can be transferred via an outlet 22 (see FIG. 3) to an passage opening (inlet) 41 (see FIG. 4) of a fall tube 4. Individualizing wheel is provided here with a plurality of receiving spaces for capsules or tablets distributed over the edge periphery. The size of receiving spaces is adapted to the size of the capsules or tablets to be held in the supply. The individualizing wheel can be rotated by means of a step motor also accommodated in the housing. Arranged in the inclined fall guide is a sensor which can detect the moment at which a capsule or tablet moves through, and thereby also whether housing has been emptied. Storage containers 2 are visible from an outer side of apparatus 1 and accessible for possible replenishment. Housing will generally be provided with multiple LEDs to enable indication of the current status of storage containers 2, and particularly in the case that storage containers 2 has to be replenished or is functioning incorrectly.

Figure 4:
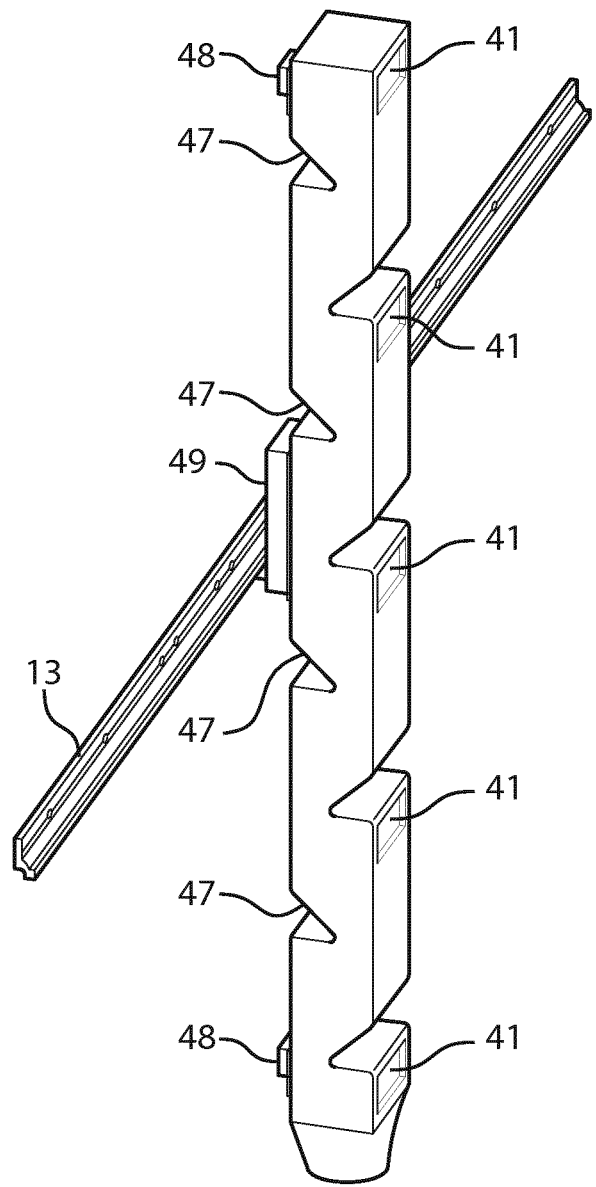
FIG. 4 is a schematic perspective view of guiding means used in the embodiment shown in FIGS. 1 to 3.

The majority of the number of applied storage containers 2 are arranged in two matrix structures (of which only a single matrix structure is shown in FIGS. 1 to 3), which matrix structures together enclose a part of two first horizontally running conveyor belts 42 for fall tubes 4. Fall tubes 4 are mounted detachably here on mounting elements 46 forming part of both first conveyor belts 42. In the shown exemplary embodiment only a few fall tubes 4 are shown, although in practice each mounting element 46 will generally be connected to a fall tube 4, whereby the first conveyor belts 42 are provided all the way round with fall tubes 4. The fall tubes 4 are provided with mating mounting elements 48 for co-action with mounting elements 46 of the two first conveyor belts 42. A particular feature however of the fall tube 4 shown in FIG. 4 is that fall tube 4 is provided with an additional central guide element 49 for co-action with a stationary guide 13 which can be attached to support structure 11, whereby additional stability is imparted to fall tube 4 and both first conveyor belts 42.

The first conveyor belts 42 are driven by drive wheels 44 which are coupled by means of a vertical shaft 43 to an electric motor 45. In order to be able to counter slippage of conveyor belts 42 the running surfaces of the drive wheels 44 take a profiled form. Through driving of the first conveyor belts 42 the fall tubes 4 can be guided along the outlets of the dosing means of the storage containers 2 arranged in matrix structures for the purpose of receiving dosed quantities of drug portions dispensed by the dosing means 21. Each fall tube 4 is adapted here for simultaneous co-action with a plurality of dosing means 21 of storage containers 2 positioned above each other. As can be seen in FIG. 4, each fall tube 4 is provided for this purpose with a number of passage openings (inlets) 41 corresponding to the number of storage containers 2 in a vertical column, with which fall tube 4 will simultaneously co-act. Fall tube 4 is also provided with several break walls 47 for limiting the maximum length of the free fall of falling drug portions, in order to limit the falling speed, and thereby limit damage to the falling drug portions (see FIG. 4). Use is generally made here of a maximum free-fall length of 20 cm. Apparatus 1 also comprises a second conveyor belt 74 provided with mounting elements 75 on which a plurality of collecting containers 3, also referred to as drug carriages, are detachably mounted. Each mounting element 74 will generally be provided here with a collecting container 3 adapted for temporary storage of a dosed quantity of drug portions made up in accordance with a prescription. Not all collecting container 3 are shown in FIGS. 1 and 2. In the shown embodiment, the second conveyor belt 74 is coupled mechanically to the first conveyor belts 42 and is also driven by electric motor 45, wherein the direction of displacement and displacement speed of conveyor belts 42 and 74 are the same. It is moreover advantageous for the first conveyor belts 42 and the second conveyor belt 74 to be mutually aligned, wherein mounting elements 46 and 75 lie in a substantially vertical line (directly under each other). The distance between adjacent mounting elements 46 and 75 amounts to 80 mm, this substantially corresponding to the width of collecting containers 3, fall tubes 4 and dosing stations 2. Collecting containers 3 are adapted to receive solid drug portions falling through fall tubes 4. Each fall tube 4 is provided for this purpose on the bottom with a passage opening for falling drug portions. For those parts of the transport route, in which the fall tubes 4 pass the storage containers 2, each collecting container 3 will be positioned here directly under an associated fall tube 4. In order to be able to prevent as far as possible sagging of conveyor belts 42 and 74 due to the weight of respectively fall tubes 4 and collecting containers 3, conveyor belts 42 are tensioned under a bias of about 600 N. Conveyor belts 42, 74 are generally manufactured from a relatively strong plastic such as polyamide (nylon).

The collecting containers 3 comprise a mating mounting element for co-action with the mounting element 75 of the second conveyor belt 74. In order to increase the stability, the collecting containers 3 also comprise securing gutters for clamping or at least engaging round the second conveyor belt 74. An upper side of the collecting containers 3 takes an opened form and has a funnel-like shape so that it can receive drug portions falling out of a fall tube 4. An underside of collecting container 3 is provided with a pivoted closing element provided with an operating tongue via which the closing element can be rotated to enable opening, and thereby unloading, of collecting container 3. Collecting containers 3 will generally be provided with a biasing element, such as a compression spring, in order to urge closing element in the direction of the position closing the collecting container, whereby erroneous opening of collecting container 3 can be prevented.

Figure 5:
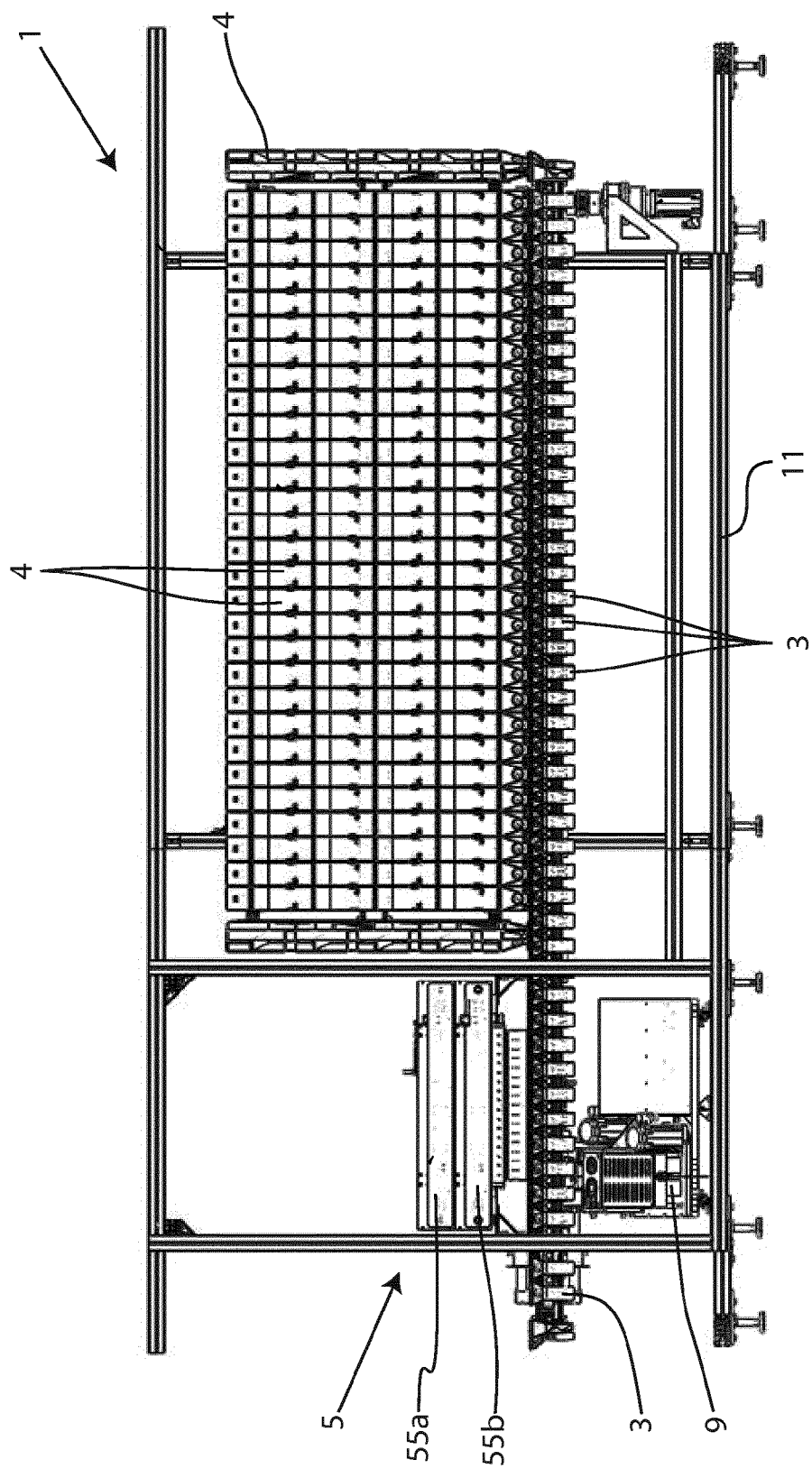
FIG. 5 is a front view of the embodiment shown in FIG. 1.

As shown in the FIGS. 1, 2 and 5, the second conveyor belt 74 is longer than the first conveyor belts 42. The advantage hereof is that collecting containers 3 can be transported further along and under a special ancillary dosing station 5 (shown in FIG. 5), preferably formed by drawers, provided with special—less frequently administered—drug portions, which special dosing station 5 is adapted for direct delivery of selected drug portions to collecting containers 3, i.e. not via fall tubes 4.

Collecting containers 3 will then be guided in the direction of the dispensing and packaging station 9, where the solid drug portions collected in accordance with prescription are removed from collecting containers 3, wherein the drug portions are transferred to an opened foil packaging. In packaging station 9 the foil packaging will be successively sealed and provided with specific (user) information. Packaging station 9 comprises a foil roll 91 which can be unwound by means of an electric motor, after which the unwound foil is guided via a plurality of guide rollers in the direction of the collecting containers 3 to be emptied. Before the foil is transported below a collecting container 3 for emptying, the foil is provided with a longitudinal fold, whereby a V-shaped fold is created in which the drug portions can be received following opening of collecting container 3. The foil can be provided with two transverse seals and a longitudinal seal to enable complete sealing of packaging. Applied in making the longitudinal seal is a heat bar which is pressed against one side of the two foil parts to be attached to each other, whereby the foil parts fuse together and the longitudinal seal is formed. It is advantageous here for each heat bar to engage foil via a stationary strip manufactured from plastic, in particular Teflon, or displaceable band in order to prevent adhesion of heat bars to the foil. The transverse seals are also created by two upright rotatable heat bars which co-act with each other and press the foil parts against each other in realizing a transverse seal. Packaging can optionally be further provided with a label. Successive packages (pouches) remain mutually connected in the first instance and together form a packaging strip 92.

The overall control of apparatus 1 is realized by a control unit 10. The control unit 10 is coupled to the dispensing means 21 of the storage containers 2, the drive motor of the first conveyor belts 42 and the second conveyor belt 74, a sensor for detecting the position of the first conveyor belts 42 carrying the fall tubes 4, and the components of the packaging station 9.

Figure 6:
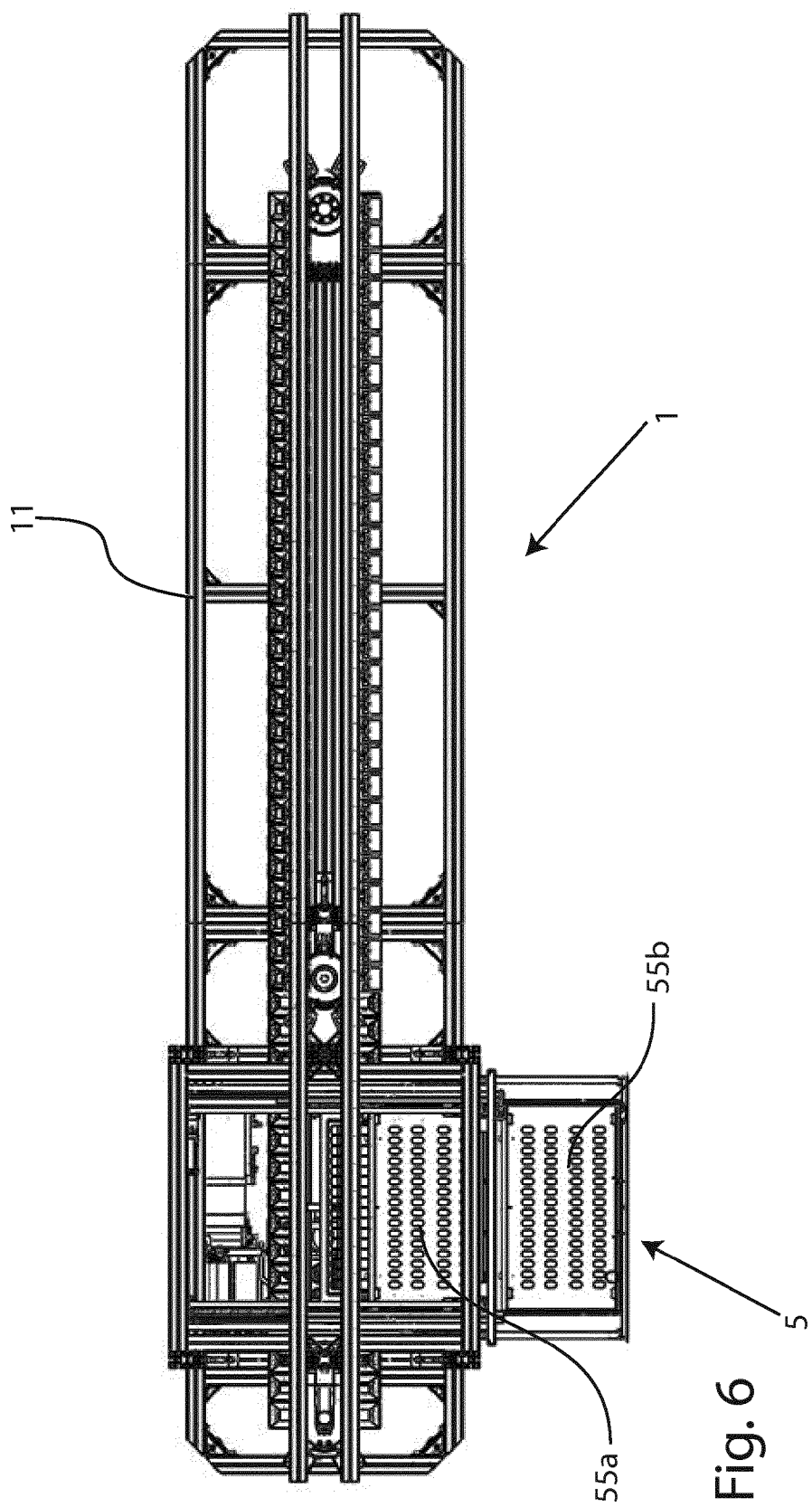
FIG. 6 is a top view of the embodiment shown in FIG. 5.

FIG. 5 shows a front view of the embodiment shown in FIG. 1 including the ancillary dosing station 5. FIG. 6 is a top view of the embodiment shown in FIG. 5. As can be seen, the ancillary dosing station 5 is located above the second conveyor belt 74 carrying the collecting containers 3, wherein the dosing station is located in an region where no fall tubes 4 mounted to the first conveyor belts are moved along the storage containers above the collecting containers 3. As already mentioned, the second conveyor belt 74 carrying the collecting containers 3 is longer than the first conveyor belts 42 carrying the fall tubes 4.

Figure 7:
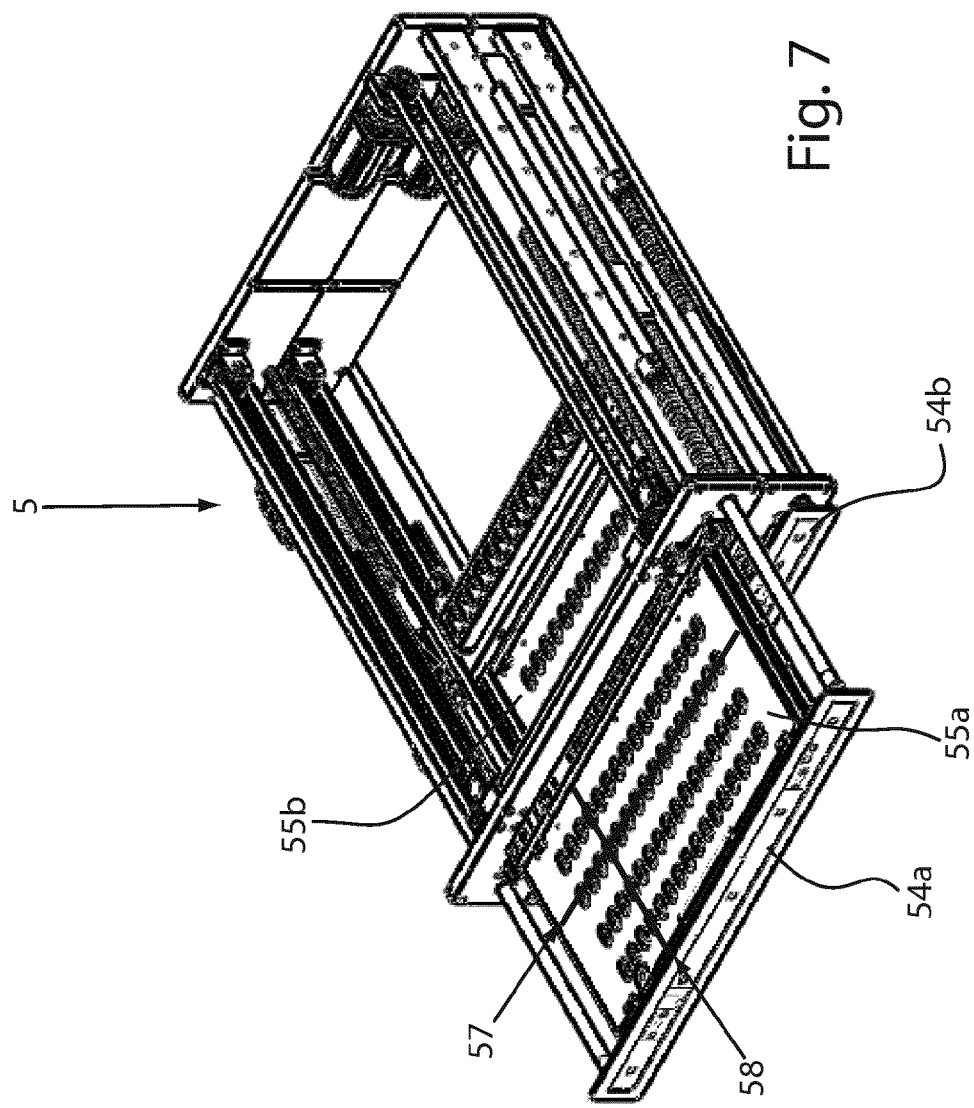
FIG. 7 is a perspective view of an ancillary dosing station used in the embodiment shown in FIG. 5, and FIGS. 8-11 are partial views of the ancillary dosing station shown in FIG. 7.

As can be seen in FIG. 7, the ancillary dosing station 5 comprises two movable sets of transport buffer receptacles formed by two drawers 55a and 55b. In the embodiment shown, each drawer 55a, 55b comprises a frame 54a, 54b and four rows 57 and 16 columns of receptacles in a horizontal plane. The frames 54a, 54b carrying the receptacles can be moved horizontally to a withdrawn position at which the receptacles are accessible from above.

Figure 8:
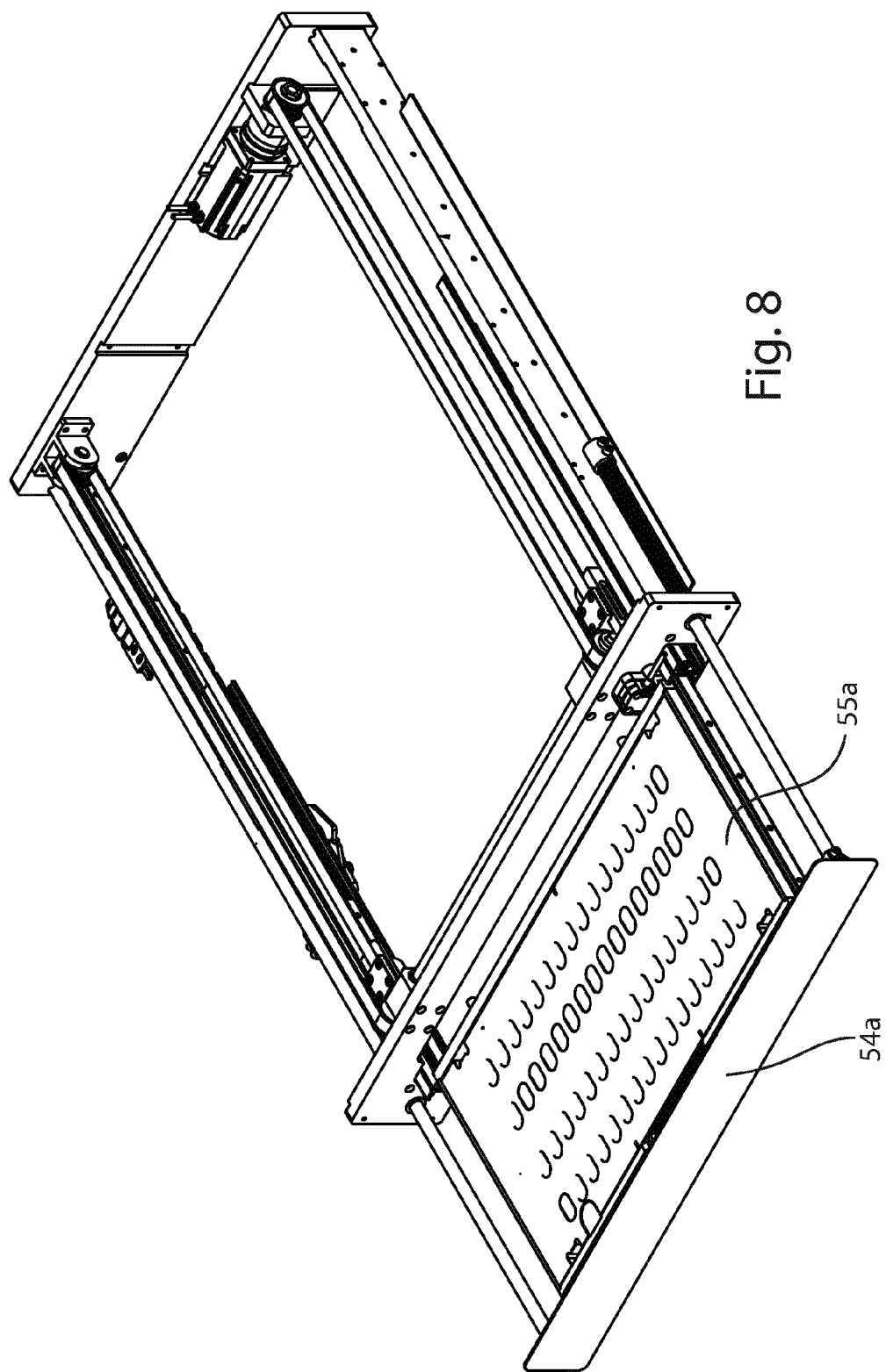
Figure 9:
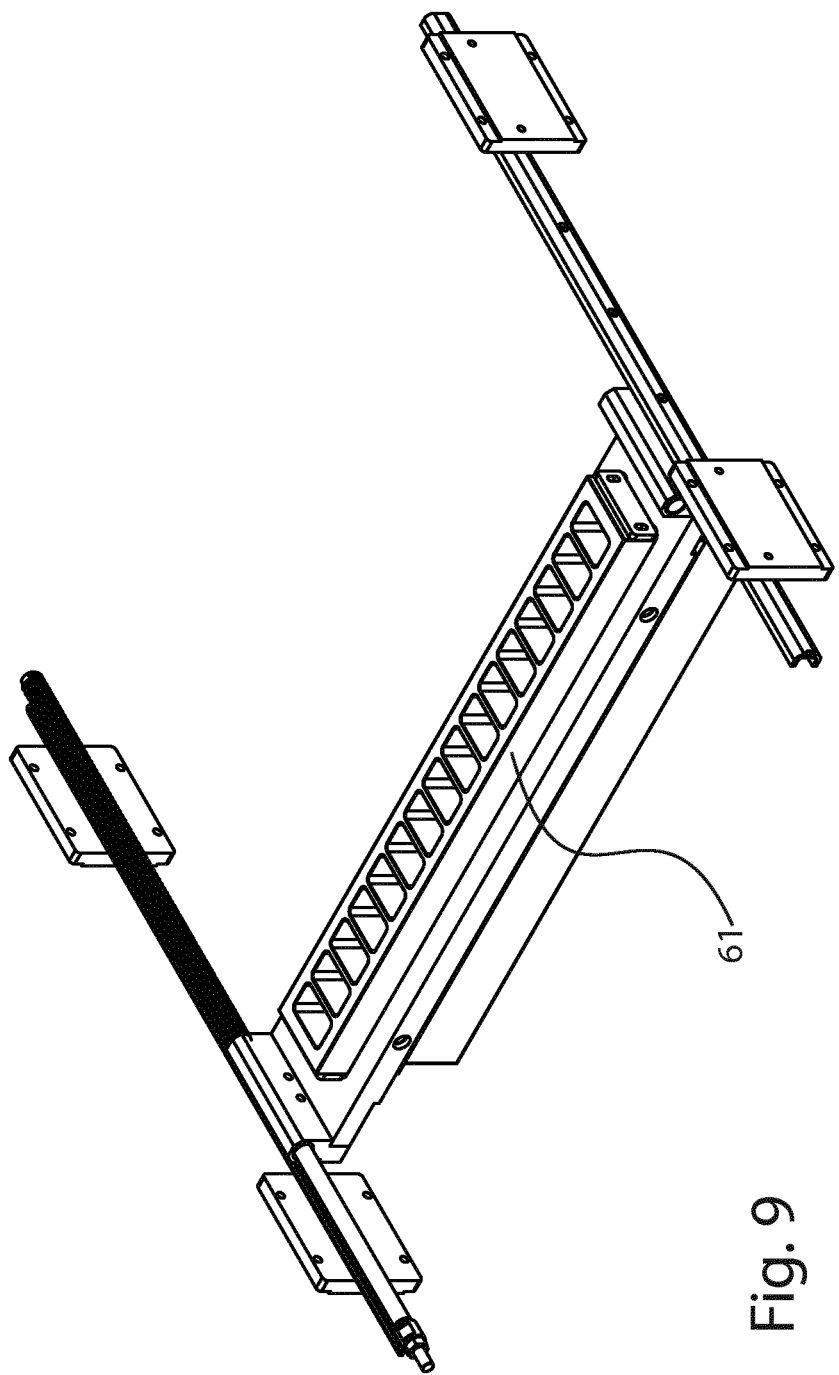
Figure 10:
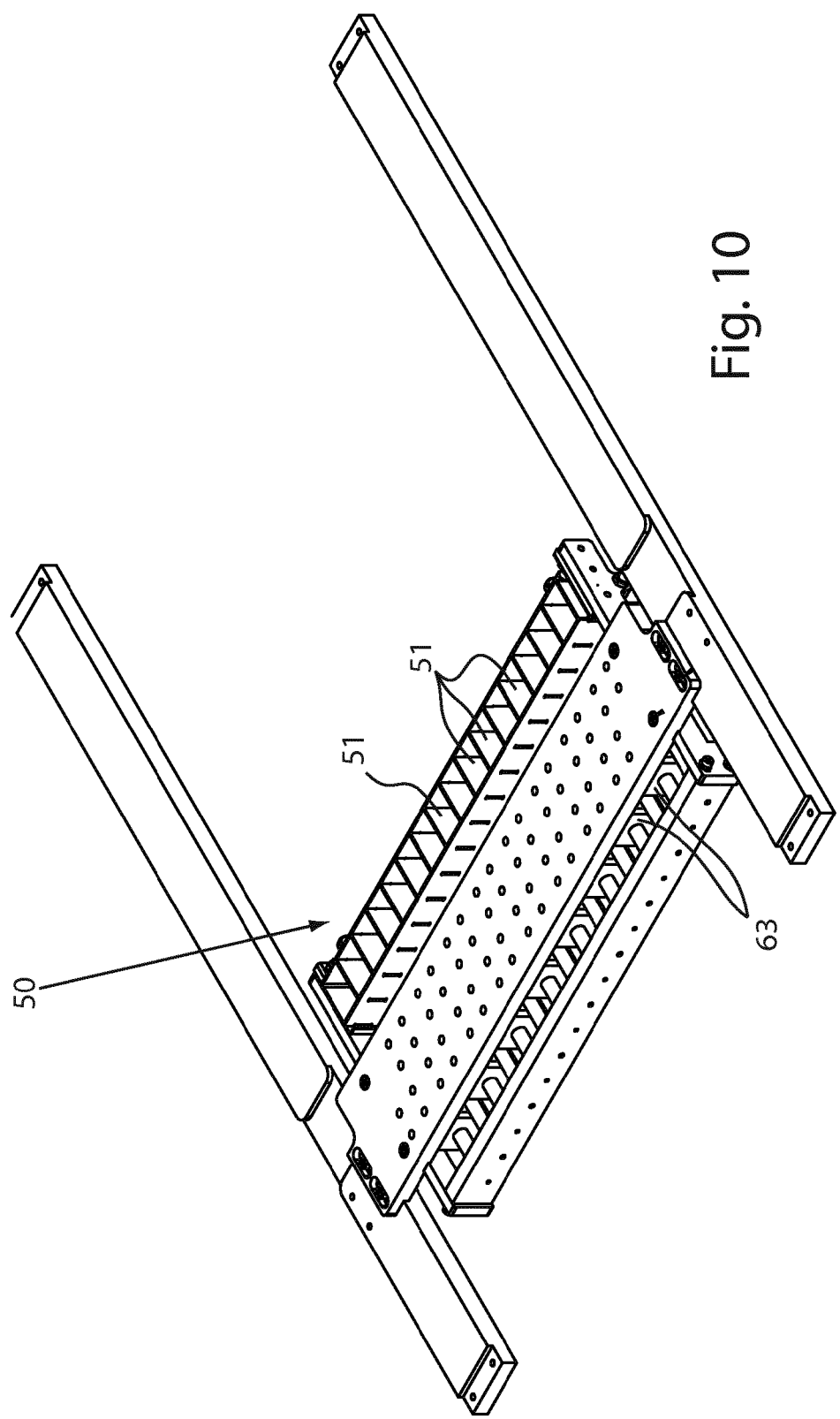
Figure 11:
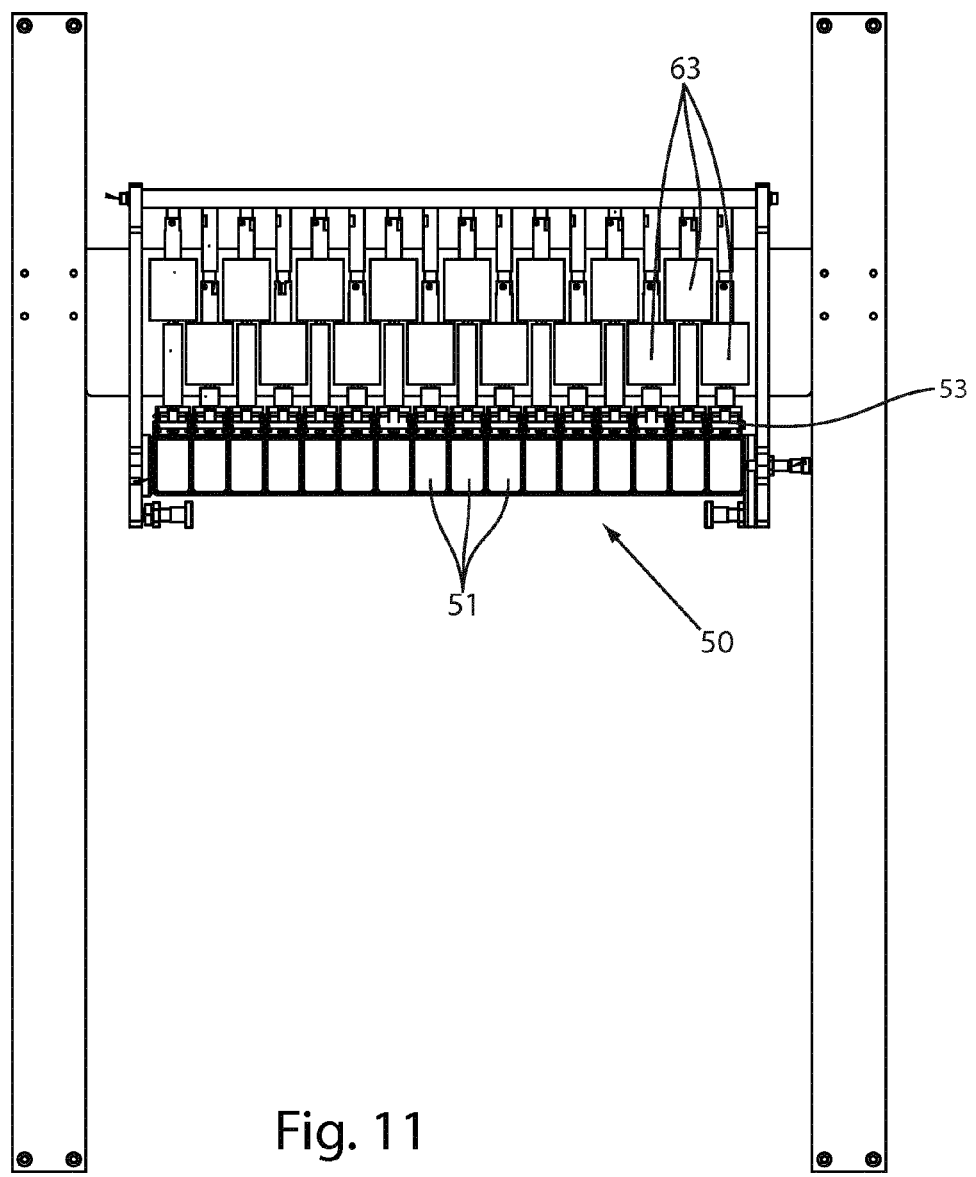

FIGS. 8-11 are partial views of components of the ancillary dosing station shown in FIG. 7, wherein FIG. 8 shows a perspective view of a drawer, and FIG. 9 shows a perspective view of an intermediate guiding member 61 for coupling a row of the upper drawer 55a to the row of the stationary buffer receptacles 51 shown in FIGS. 10 and 11.

The transport buffer receptacles of a drawer 55a, 55b can be moved horizontally so that one row 57 of the transport buffer receptacles is positioned above the row 50 of stationary buffer receptacles 51. Each transport buffer receptacle has a bottom opening which is normally closed. When a row 57 of the transport buffer receptacles is positioned above the row 50 of stationary buffer receptacles 51, all bottom openings of the receptacles of one row of the drawer 55a, 55b can be opened simultaneously, so that all drug portions fall from the transport buffer receptacles into corresponding stationary buffer receptacles 51. If the upper drawer 55a is positioned above the row 50 of stationary buffer receptacles 51, an intermediate guiding member 61 (shown in FIG. 9) is shifted into the gap between the bottom of the receptacles of the upper drawer 55*a* and the upper edge of the row 50 of stationary buffer receptacles 51 in order to guide the falling drug portions.

The row 50 of stationary buffer receptacles 51 is positioned above the path along which the collecting containers 3 are moving. FIG. 10 shows a perspective top view of the row 50 of stationary buffer receptacles 51. FIG. 11 shows a bottom view of the stationary buffer receptacles 51. Each stationary buffer receptacle 51 comprises a delivering means consisting of a closure member 53 at the bottom of the receptacle and an electromechanical drive 63 operating the closure member 53. The closure members 53 are coupled to the control unit 10 so that each closure members 53 can be opened selectively depending on the positions of the moving collecting containers 3 known by the control unit 10. Thus, the solid drug portions temporarily held in the buffer receptacles can be output into selected collecting containers 3.

In the withdrawn position of a drawer 55*a*, 55*b* (shown in FIGS. 6, 7 and 8) a removable transport tray (not shown) can be laid down on the receptacles of the drawer 55*a*, 55*b*. The transport tray has a plurality of compartments, each compartment for receiving a solid drug portion or a small number (e.g. 2 to 10) of solid drug portions. The number and the arrangement of the compartments correspond to the number and the arrangement of the receptacles of the underlying transport buffer. Each compartment has a bottom opening which is normally closed. All bottom openings of the compartments of the tray can be opened simultaneously by a manually operated member, so that all drug portions fall from the compartments into corresponding transport buffer receptacles of the withdrawn drawer 55*a*, 55*b*.

The compartments of the tray can be filled manually at a fill docking station (not shown). The fill docking station preferably comprises means that indicate—to an operator filling the compartments—a selected compartment into which a particular solid drug portion is to be filled, e.g. by activating an lamp or LED mounted at to the compartment to be filled or by directing a light beam to the compartment to be filled.

It will be apparent that the invention is not limited to the exemplary embodiments shown and described here, but that numerous variants which will be self-evident to the skilled person in this field are possible within the scope of the appended claims.

What is claimed is:

1. An apparatus for packaging dosed quantities of solid drug portions, comprising:
   a plurality of storage containers each storing a plurality of solid drug portions and having a dosing element configured to dispense first dosed quantities of the stored solid drug portions;
   a plurality of moveable collecting containers configured to collect solid drug portions and output the collected solid drug portions to a packaging station;
   at least one fall tube configured to guide the solid drug portions dispensed by the dosing element to one of the plurality of collecting containers;
   an ancillary dosing station configured to deliver second dosed quantities of solid drug portions to the collecting containers, the ancillary dosing station comprising a plurality of buffer receptacles, each buffer receptacle comprising a closure member, wherein each buffer receptacle is configured to temporarily hold one or more second dosed quantities of solid drug portions and to output the temporarily held one or more solid drug portions to one of the collecting containers at one of the at least one second location during movement of the collecting container along a predetermined path;
   a conveyor configured to move the collecting containers between at least one first location at which the collecting containers receive the solid drug portions from the at least one fall tube, at least one second location at which the collecting containers receive the solid drug portions from the ancillary dosing station, and at least one third location at which the collecting containers output the collected solid drug portions to the packaging station, the collecting containers configured to be moveable along the predetermined path; and
   a control unit coupled to the conveyor and the closure members of the buffer receptacles, the control unit configured to control the closure members based on the positions of the moving collecting containers so that the solid drug portions temporarily held in the buffer receptacles are output to selected collecting containers.

2. The apparatus of claim 1, wherein the buffer receptacles of the ancillary dosing station are stationary and arranged so that each closure member can output the solid drug portions at a specific position above the predetermined path along which the collecting containers are moving, the control unit configured to trigger a particular closure member of the stationary buffer receptacles if a particular collecting container into which the solid drug portions is to be delivered is moved below the specific position of the particular closure member.

3. The apparatus of claim 2, wherein each closure member is disposed at the bottom of the corresponding stationary buffer receptacle.

4. The apparatus of claim 2, wherein the ancillary dosing station comprises at least one set of moveable transport buffer receptacles, wherein the moveable transport buffer receptacles of the set can be moved together between at least one first position at which the moveable transport buffer receptacles can be filled and at least one second position at which at least a portion of the moveable transport buffer receptacles can be unloaded into the stationary buffer receptacles.

5. The apparatus of claim 4, wherein the movable transport buffer receptacles are configured to be horizontally moveable between the at least one first position and the at least one second position.

6. The apparatus of claim 2, wherein the predetermined path is a horizontal linear path, so that the stationary buffer receptacles are arranged in a linear row above the linear path.

7. The apparatus of claim 6, wherein the movable transport buffer receptacles of one set are arranged in a matrix of columns and rows in a horizontal plane, wherein a row of the moveable transport buffer receptacles is positioned above the row of the stationary buffer receptacles and is configured to be unloaded if the set of moveable transport buffer receptacles is moved into one of a number of second positions, the number of second positions corresponding to the number of receptacles in a column.

8. The apparatus of claim 4, wherein the ancillary dosing station comprises two sets of movable transport buffer receptacles, wherein one set is configured to be filled in its first position while the other set is configured to be unloaded in one of its at least one second positions.

9. The apparatus of claim 4, wherein the ancillary dosing station comprises at least one removable transport tray having a plurality of compartments, each compartment configured to receive one or more solid drug portions and to unload into one of the set of moveable transport buffer receptacles, wherein the arrangement of the compartments of the transport tray corresponds to the arrangement of the receptacles of the set of moveable transport buffer receptacles, whereby the transport tray is configured to be positioned above the set of moveable transport buffer receptacles positioned at the first position so that each compartment is positioned above a corresponding receptacle, the bottom of each compartment comprising a closure member which is configured to be opened if the tray is positioned above the set of moveable transport buffer receptacles so that the transport buffer receptacles can be filled.

10. The apparatus of claim 9, further comprising a fill docking station to which the removable transport tray is configured to be coupled, the fill docking station comprising an indicator configured to assist manual filling of the compartments with the solid drug portions.

11. The apparatus of claim 1, comprising a plurality of moveable fall tubes, each fall tube configured to be at least temporarily associated with a collecting container being configured to be arranged vertically above the associated collecting container during its movement along the predetermined path at the at least one first location.

12. The apparatus of claim 11, wherein the plurality of storage containers and dosing elements are arranged in at least one matrix of rows of vertical columns, each column comprising a plurality of vertically stacked storage containers, wherein output openings of the dosing elements are arranged adjacent to corresponding input openings in a sidewall of a fall tube when the moving fall tube is positioned adjacent to the column of storage containers.

13. An apparatus for packaging dosed quantities of solid drug portions, comprising:
 a plurality of dosing stations configured to dispense first dosed quantities of solid drug portions;
 a plurality of moveable collecting containers;
 a plurality of fall tubes configured to guide the first dosed quantities of solid drug portions to the plurality of moveable collecting containers;
 a conveyor configured to move the collecting containers;
 a controller;
 a packaging station, wherein each collecting container is configured to collect and output solid drug portions to the packaging station; and
 an ancillary dosing station configured to dispense second dosed quantities of solid drug portions to the plurality of moveable collecting containers, the ancillary dosing station comprising:
  a plurality of stationary buffer receptacles, each stationary buffer receptacle comprising:
   a closure member; and
   an electromechanical drive configured to operate the closure member,
   wherein each stationary buffer receptacle is configured to temporarily hold and to output the second dosed quantities of solid drug portions to the collecting containers during movement of the collecting container along a predetermined path, wherein the closure member and the electromechanical drive are controlled by the controller; and
  at least one set of moveable transport buffer receptacles, wherein the moveable transport buffer receptacles of the set are configured to be moved together between at least one first position at which the moveable transport buffer receptacles are filled and at least one second position at which at least a portion of the moveable transport buffer receptacles are unloaded into the stationary buffer receptacles.

14. The apparatus of claim 13, wherein the conveyor is configured to move the collecting containers between at least one first location at which the collecting containers receive the first dosed quantities of solid drug portions from the fall tubes, at least one second location at which the collecting containers receive the second dosed quantities of solid drug portions from the ancillary dosing station, and at least one third location at which the collecting containers output the collected first and second dosed quantities of solid drug portions to the packaging station, the collecting containers configured to be moveable along the predetermined path.

15. The apparatus of claim 13, wherein the movable transport buffer receptacles are configured to be horizontally moveable between the at least one first position and the at least one second position.

16. The apparatus of claim 13, wherein the movable transport buffer receptacles of one set are arranged in a matrix of columns and rows in a horizontal plane, wherein a row of the moveable transport buffer receptacles is positioned above a row of the stationary buffer receptacles and is configured to be unloaded if the set of moveable transport buffer receptacles is moved into one of a number of the second positions, the number of the second positions corresponding to the number of moveable transport buffer receptacles in a column.

17. The apparatus of claim 13, wherein the ancillary dosing station further comprises at least one removable transport tray having a plurality of compartments, each compartment configured to receive one or more solid drug portions and to unload into one of the set of moveable transport buffer receptacles, wherein the arrangement of the compartments of the transport tray corresponds to the arrangement of the receptacles of the set of moveable transport buffer receptacles, wherein the transport tray is configured to be positioned above the set of moveable transport buffer receptacles positioned at the first position so that each compartment is positioned above a corresponding moveable transport buffer receptacle, the bottom of each compartment comprising a closure member which is configured to be opened if the tray is positioned above the set of moveable transport buffer receptacles.

18. The apparatus of claim 13, further comprising a fill docking station to which the removable transport tray is configured to be coupled, the fill docking station comprising an indicator configured to assist manual filling of the compartments with the second dosed quantities of solid drug portions.

19. An apparatus for packaging dosed quantities of solid drug portions, comprising:
 a plurality of moveable collecting containers;
 a plurality of fall tubes;
 a plurality of dosing stations configured to dispense first solid drug portions to the plurality of moveable collecting containers through the plurality of fall tubes;
 an ancillary dosing station configured to dispense second solid drug portions to the plurality of moveable collecting containers;
 a conveyor configured to move the collecting containers between at least one first location at which the collecting containers receive the first solid drug portions from the fall tubes, at least one second location at which the collecting containers receive the second solid drug portions from the ancillary dosing station, and at least one third location at which the collecting containers output the collected first and second solid drug portions, the collecting containers configured to be moveable along a predetermined path, the ancillary dosing station comprising:
a plurality of stationary buffer receptacles; and
at least one set of moveable transport buffer receptacles, wherein the moveable transport buffer receptacles of the set are configured to be moved together between at least one first position at which the moveable transport buffer receptacles are filled and at least one second position at which at least a portion of the moveable transport buffer receptacles are unloaded into at least one or more of the plurality of stationary buffer receptacles.

20. The apparatus of claim 19, wherein the ancillary dosing station further comprises at least one removable transport tray having a plurality of compartments, each compartment configured to receive one or more solid drug portions and to unload into one of the set of moveable transport buffer receptacles, wherein the arrangement of the compartments of the transport tray corresponds to the arrangement of the receptacles of the set of moveable transport buffer receptacles, wherein the transport tray is configured to be positioned above the set of moveable transport buffer receptacles positioned at the first position so that each compartment is positioned above a corresponding moveable transport buffer receptacle, the bottom of each compartment comprising a closure member which is configured to be opened if the tray is positioned above the set of moveable transport buffer receptacles.

\* \* \* \* \*